(12) United States Patent
Kray et al.

(10) Patent No.: US 10,557,350 B2
(45) Date of Patent: Feb. 11, 2020

(54) I BEAM BLADE PLATFORM

(71) Applicant: General Electric Company, Schenectady, NY (US)

(72) Inventors: Nicholas Joseph Kray, Mason, OH (US); Andreas Mastorakis, Corona, CA (US)

(73) Assignee: General Electric Company, Schenectady, NY (US)

( * ) Notice: Subject to any disclaimer, the term of this patent is extended or adjusted under 35 U.S.C. 154(b) by 205 days.

(21) Appl. No.: 15/474,049

(22) Filed: Mar. 30, 2017

(65) Prior Publication Data
US 2018/0283187 A1    Oct. 4, 2018

(51) Int. Cl.
| F01D 5/02 | (2006.01) |
| F01D 5/30 | (2006.01) |
| F01D 11/00 | (2006.01) |

(52) U.S. Cl.
CPC ............. *F01D 5/02* (2013.01); *F01D 5/30* (2013.01); *F01D 11/008* (2013.01); *F05D 2240/80* (2013.01); *F05D 2250/75* (2013.01); *F05D 2300/603* (2013.01)

(58) Field of Classification Search
CPC ............ F05D 2240/80; F05D 2250/75; F01D 11/008; F01D 5/02; F01D 5/22; F01D 5/282; E04C 3/06; E04C 3/07; E04C 3/14; E04C 3/29; E04C 2003/0452; B29D 99/0025
USPC .......................................... 52/837, 838, 841
See application file for complete search history.

(56) References Cited

U.S. PATENT DOCUMENTS

| 3,801,222 | A | 4/1974 | Violette |
| 6,217,283 | B1 | 4/2001 | Ravenhall et al. |
| 8,529,208 | B2 | 9/2013 | Brault et al. |
| 2012/0263596 | A1* | 10/2012 | Evans .................... F01D 5/28 416/193 A |
| 2014/0086751 | A1 | 3/2014 | Bottome et al. |
| 2014/0186187 | A1 | 7/2014 | Lamboy et al. |
| 2014/0315457 | A1 | 10/2014 | Marchal et al. |
| 2014/0349538 | A1 | 11/2014 | Marchal et al. |
| 2015/0132134 | A1 | 5/2015 | Murdock |
| 2015/0167209 | A1 | 6/2015 | Marchal et al. |
| 2015/0337661 | A1 | 11/2015 | Alarcon et al. |

(Continued)

FOREIGN PATENT DOCUMENTS

| FR | 2 988 426 A1 | 9/2013 |
| FR | 2988426 | * 9/2013 ............... F01D 5/22 |

*Primary Examiner* — Kenneth J Hansen
(74) *Attorney, Agent, or Firm* — Dority & Manning, P.A.

(57) ABSTRACT

Fan blade platform includes axially extending I beam supporting radially outer skin having flowpath surface. I beam includes upper and lower or radially outer and inner I flanges on radially outer and inner beam ends of axially extending I web. Radially outer skin on top of and bonded or otherwise attached to radially outer I flange. I beam may be integral and monolithic and made from a non-metallic composite or thermoplastic material and have post cure formed weight relief holes. I beam may include oppositely facing or back to back first and second C beams. First C beam including axially extending first C web disposed between radially outer and inner first C flanges. Second C beam including axially extending second C web disposed between upper and lower or radially outer and inner second C flanges. I beam may be asymmetrical about center plane of I web.

26 Claims, 6 Drawing Sheets

(56) References Cited

U.S. PATENT DOCUMENTS

2016/0160663 A1 6/2016 Mortier et al.
2016/0177754 A1 6/2016 Robertson
2016/0341071 A1 11/2016 Alarcon et al.

* cited by examiner

I BEAM BLADE PLATFORM

BACKGROUND OF THE INVENTION

The present invention relates generally to gas turbine engine blade platforms and, more particularly, to aircraft gas turbine engine fan blade platforms.

An aircraft turbofan gas turbine engine includes a fan assembly having a plurality of circumferentially spaced apart fan blades extending radially outwardly from a rotor disk. The fan assembly typically includes a plurality of circumferentially spaced apart fan blades each having a dovetail root disposed in a complementary, axially extending dovetail groove or slot in a perimeter or rim of a rotor disk. A spinner is mounted to a front end of the fan assembly to provide smooth airflow into the fan. A radially inner flowpath boundary for the airflow channeled between the blades is provided typically by platforms at the blade roots which circumferentially abut each other between adjacent fan blades. Blade platforms may be used between compressor and turbine blades.

One current platform design uses a resin transfer molding (RTM) method design which is costly to manufacture and require several pre-forms to be assembled in a mold then injected with resin. There is also an extended cure time for the part. Metallic and composite fan blade platforms have been made and designed. There is a need for lightweight, more easily manufactured, and less expensive fan blade platforms.

BRIEF DESCRIPTION OF THE INVENTION

A platform for use between adjacent gas turbine engine fan blades joined to a rotor disk to provide an inner flowpath boundary. The platform including an axially extending I beam supporting a radially outer skin having a flowpath surface, the I beam including upper and lower or radially outer and inner I flanges on upper and lower or radially outer and inner beam ends of an axially extending I web, and the radially outer skin on top of and bonded or otherwise attached to the radially outer I flange. The I beam may be being integral and monolithic and made from a non-metallic composite or thermoplastic material.

The I beam may include oppositely facing or back to back first and second C beams. The first C beam may include an axially extending first C web disposed between upper and lower or radially outer and inner first C flanges and the second C beam may include an axially extending second C web disposed between upper and lower or radially outer and inner second C flanges. The first and second C beams are open in opposite first and second circumferential or side directions and the first and second webs are back to back along a planar interface. The first and second C webs may be back to back and bonded or otherwise attached together. Each of the first and second C webs may be integral and monolithic and made from a non-metallic composite or thermoplastic material.

The I beam may be asymmetrical about a center plane of the I web. The asymmetrical embodiment of the I beam may have the first C beam including an axially extending first C web disposed between upper and lower or radially outer and inner first C flanges, the second C beam including an axially extending second C web disposed between upper and lower or radially outer and inner second C flanges, the first and second C beams open in opposite first and second circumferential or side directions, and the first and second webs being back to back along a planar interface.

In one asymmetrical embodiment of the I beam the first and second C beams have asymmetrical I beam thicknesses of at least one of the axially extending first and second C webs, the upper or radially outer first and second C flanges, and the lower or radially inner first and second C flanges.

In another asymmetrical embodiment of the I beam the first and second C beams include asymmetrical lower or radially inner first and second C flanges.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
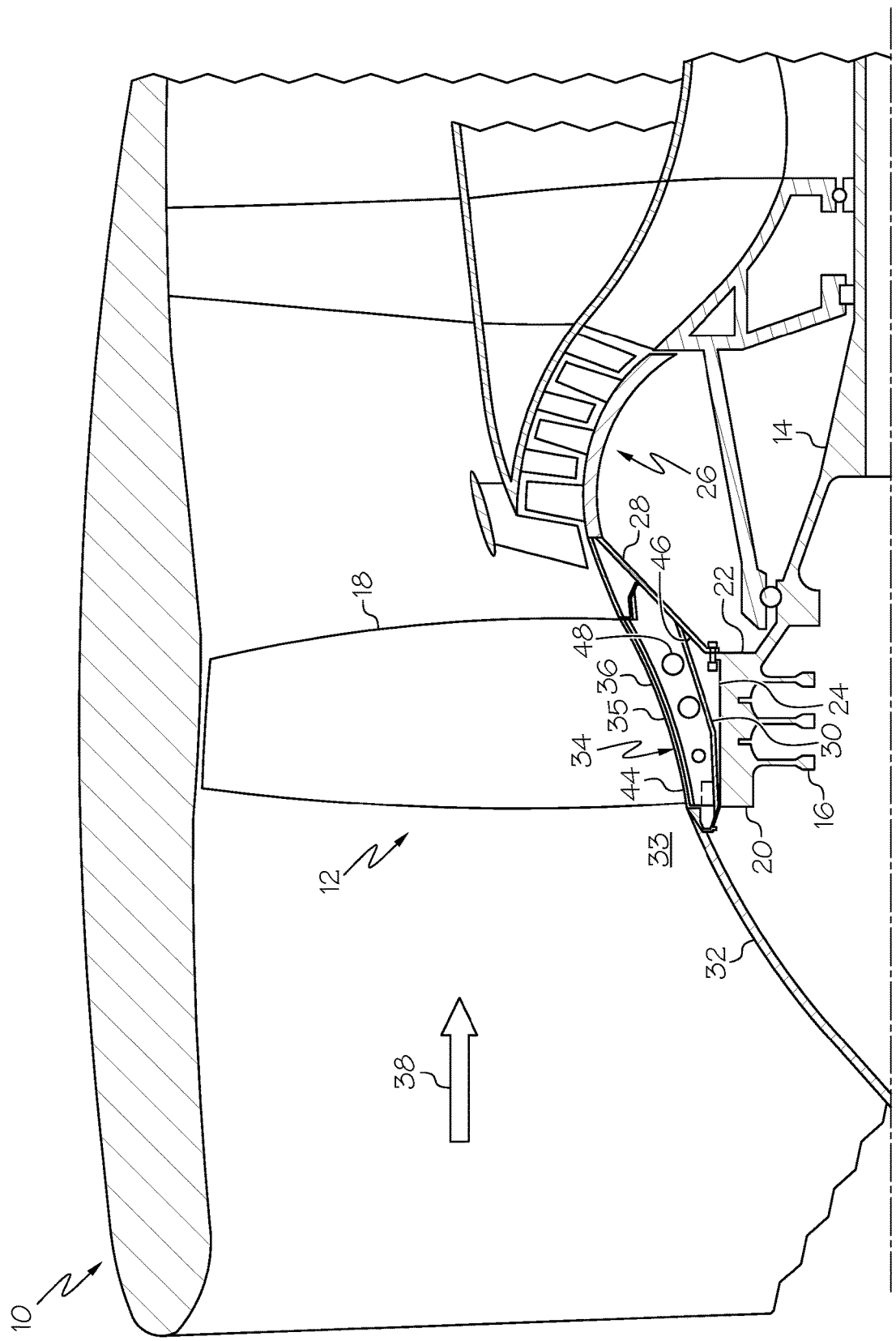
FIG. 1 is a partial cross-sectional view illustration of an exemplary turbofan gas turbine engine having an I beam fan blade platform.

Illustrated in FIG. 1 is an exemplary turbofan gas turbine engine 10 used for powering an aircraft in flight (not shown). The engine 10 includes a fan assembly 12 which is rotated by a conventional fan shaft 14 powered by a conventional low pressure turbine (not shown). The fan assembly 12 includes a rotor disk 16 from which extends radially outwardly a plurality of circumferentially spaced apart fan or rotor blades 18 (only one shown in FIG. 1). The rotor disk 16 includes axially spaced apart forward and aft sides 20, 22, respectively, and a radially outer surface 24 extending therebetween.

Disposed downstream of the fan assembly 12 is a booster compressor 26 having axially spaced apart vane and blade rows with the blades thereof being joined to a booster spool or shaft 28. The booster shaft 28 is suitably fixedly joined to the rotor disk aft side 22. A conical spinner 32 is joined to the rotor disk forward side 20 to provide an aerodynamic flowpath 33 for air 38 entering the fan assembly 12. A plurality of platforms 34 (only one shown in FIG. 1) are provided between the fan blades 18 with each platform 34 being disposed between respective adjacent ones of the fan blades 18 and radially outwardly from the rotor disk 16.

Referring to FIGS. 1-5, each of the platforms 34 has a top or radially outer skin 35 having a top or radially outer surface 36 extending between the respective adjacent fan blades 18 so as to collectively define an inner flowpath boundary for channeling air 38 between the fan blades 18. Thus, the platforms 34 function to maintain the engine flowpath 33 definition between the spinner 32 and the booster compressor 26.

Figure 2:
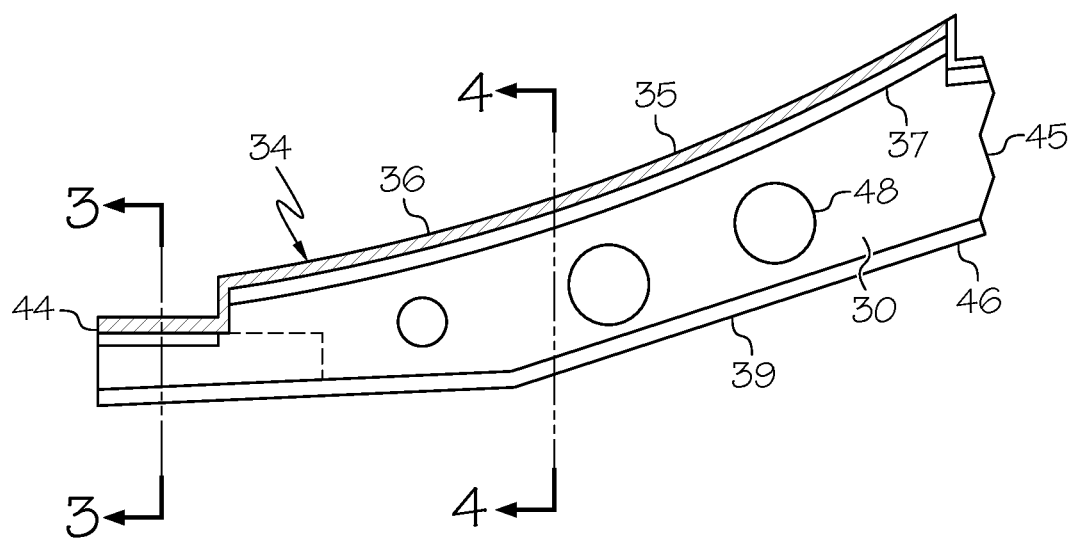
FIG. 2 is an enlarged cross-sectional view illustration of the fan blade platform illustrated in FIG. 1.
Figure 3:
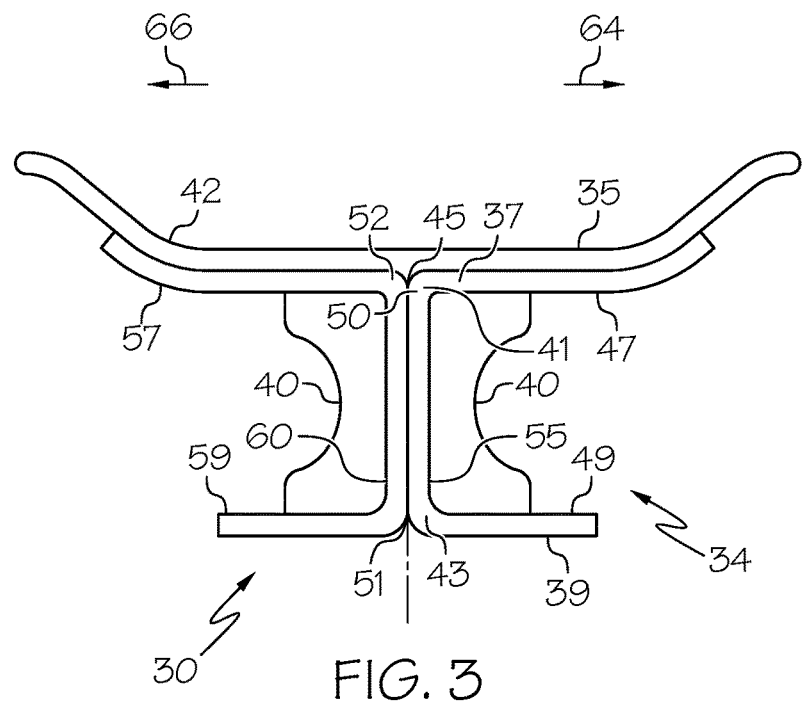
FIG. 3 is an axial forward looking aft cross-sectional view illustration of the fan blade platform through 3-3 in FIG. 1.
Figure 4:
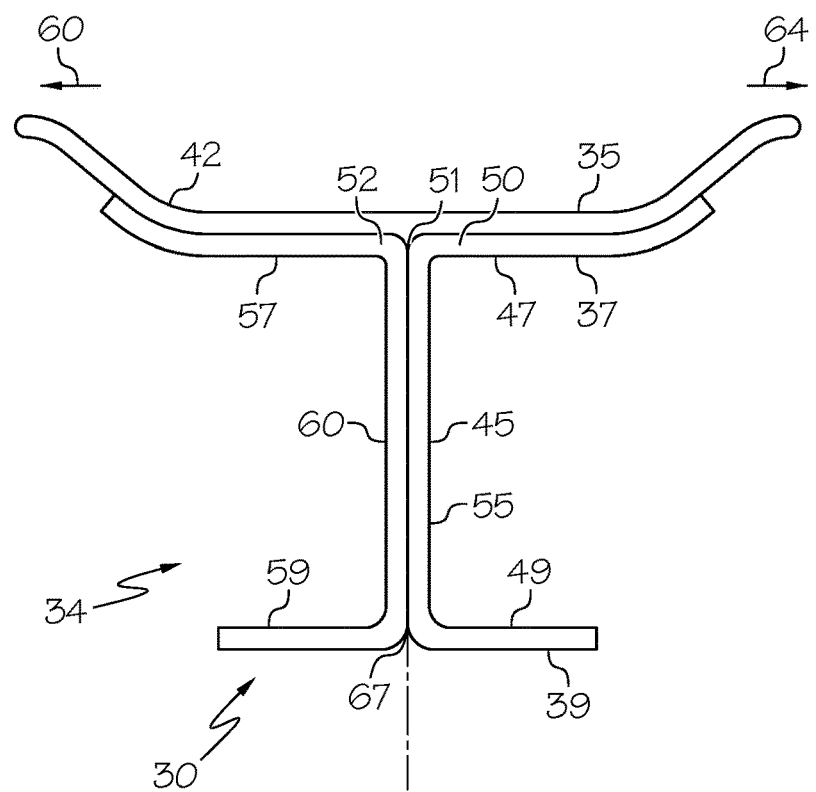
FIG. 4 is an axial forward looking aft cross-sectional view illustration of the fan blade platform through 4-4 in FIG. 1.

Referring to FIGS. 2-4, each of the platforms 34 includes an axially extending I beam 30 supporting a radially outer skin 35 having a flowpath surface 42. The I beam 30 includes an axially extending I web 45 disposed between and integrally formed and monolithic with upper and lower or radially outer and inner I flanges 37, 39 at upper and lower or radially outer and inner beam ends 41, 43 of the I web 45. The radially outer skin 35 sits on top of and is bonded or otherwise attached to the radially outer I flange 37. The platform 34 has a forward end 44 disposed near the disk forward side 20 and an axially opposite aft end 46 disposed near the disk aft side 22. The I beam 30 contributes the bulk of the platform's mass and, consequently, provides the platform 34 with the necessary strength to carry its centrifugal load. Stiffeners 40 extend between the outer and inner I flanges 37, 39 along the I web 45 near a forward end 44 of the platform 34.

To reduce the overall weight of the platform 34 while maintaining suitable strength thereof, the I beam 30 may be made from a non-metal, composite or thermoplastic material. For example, one suitable composite material would be graphite fibers embedded in an epoxy resin. The I beam 30 may be an integral monolithic part or may be made from components bonded together or otherwise attached.

Referring to FIGS. 3 and 4, the I beam 30 may be constructed from and include oppositely facing or back to back first and second C beams 50, 52. The first C beam 50 includes an axially extending first C web 55 disposed between upper and lower or radially outer and inner first C flanges 47, 49. The second C beam 52 includes an axially extending second C web 60 disposed between upper and lower or radially outer and inner second C flanges 57, 59. The first and second C beams 50, 52 open in opposite first and second circumferential or side directions 64, 66 and the first and second webs 55, 60 are back to back along a planar interface 67. The upper or radially outer I flange 37 includes or is formed by the upper or radially outer first and second C flanges 47, 57. The lower or radially inner I flange 39 includes or is formed by the lower or radially inner first and second C flanges 49, 59. The first and second webs 55, 60 may be bonded or otherwise attached together along the planar interface 67.

Figure 5:
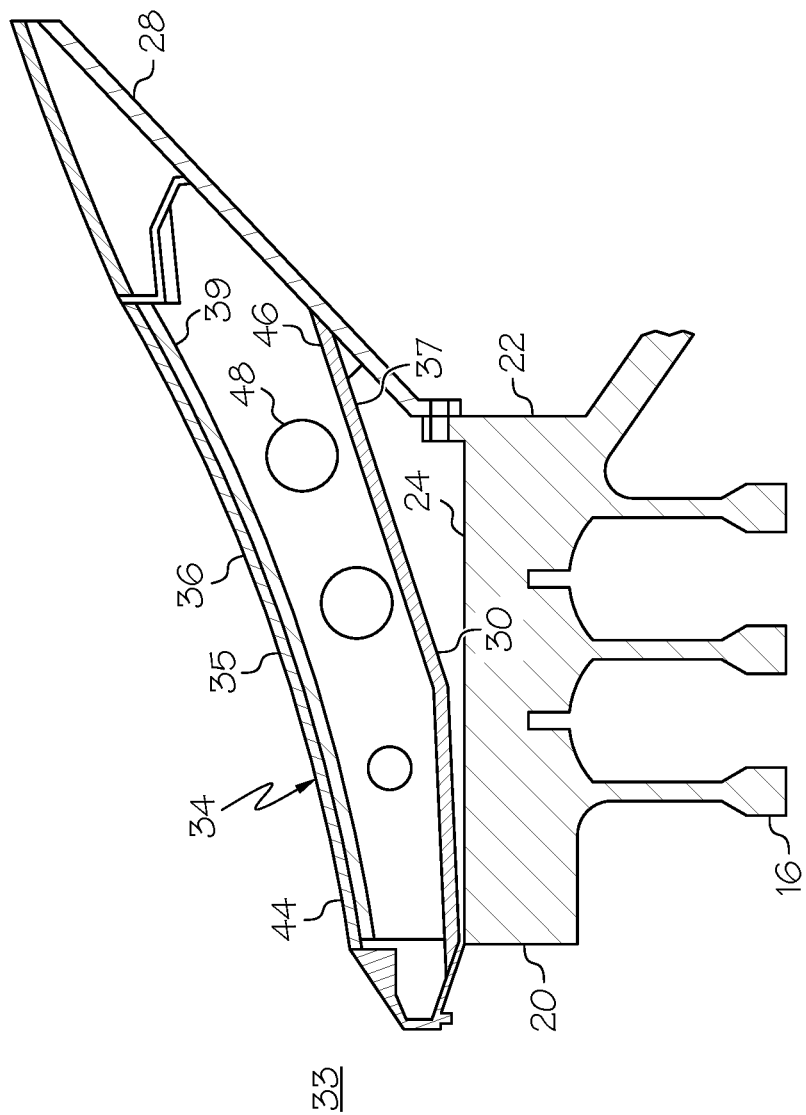
FIG. 5 is an enlarged cross-sectional view illustration of the fan blade platform mounted on a disk illustrated in FIG. 1.

The I beam 30 constructed from the two C beams includes the upper or radially outer I flange 37 formed from the upper or radially outer first and second C flanges 47, 57. The lower or radially inner I flange 39 is formed from the lower or radially inner first and second C flanges 49, 59. The I web 45 is formed from the first and second webs 55, 60. To further reduce weight, a number of weight relief holes 48 may be formed in the I web 45 or the first and second webs 55, 60 as illustrated in FIGS. 2 and 5. The first and second C beams 50, 52 may be symmetric about the interface 67 as illustrated in FIGS. 3 and 4. I beams 30 made from a non-metal, composite or thermoplastic material may have the weight relief holes 48 formed post curing.

Figure 6:
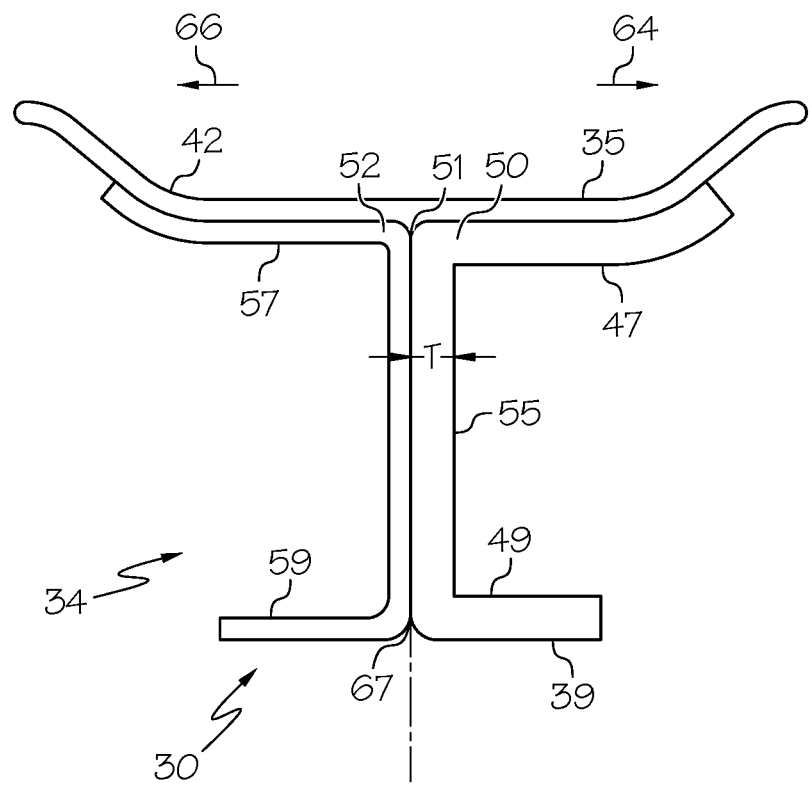
FIG. 6 is an axial forward looking aft cross-sectional view illustration of the fan blade platform formed with a first un-symmetric I beam formed with a second C beam thicker than a first C beam.
Figure 7:
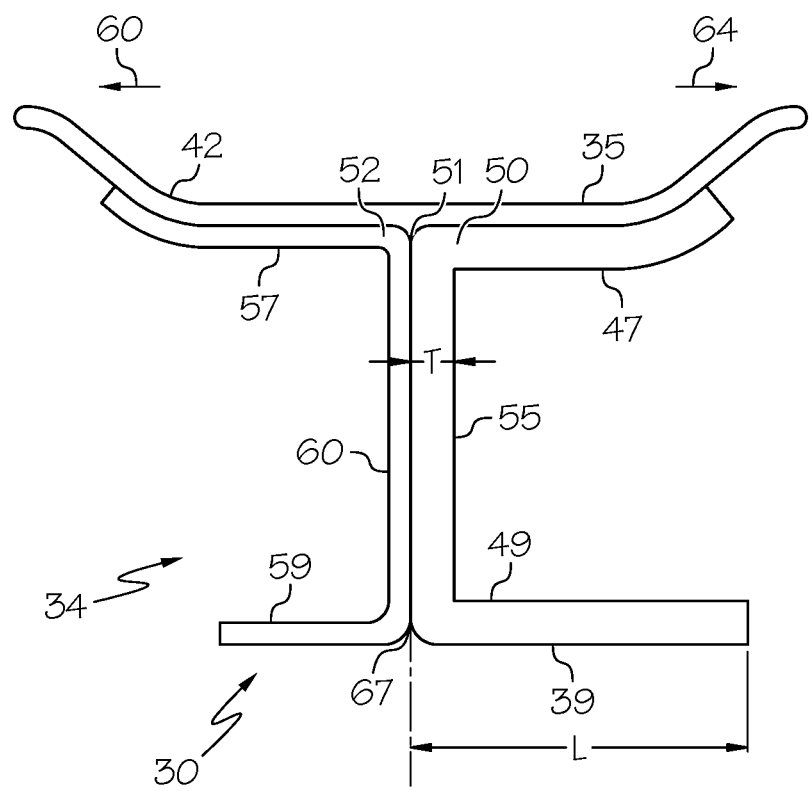
FIG. 7 is an axial forward looking aft cross-sectional view illustration of the fan blade platform formed with a second un-symmetric I beam formed with a second C beam having a lower C flange longer than that of a first C beam.
Figure 8:
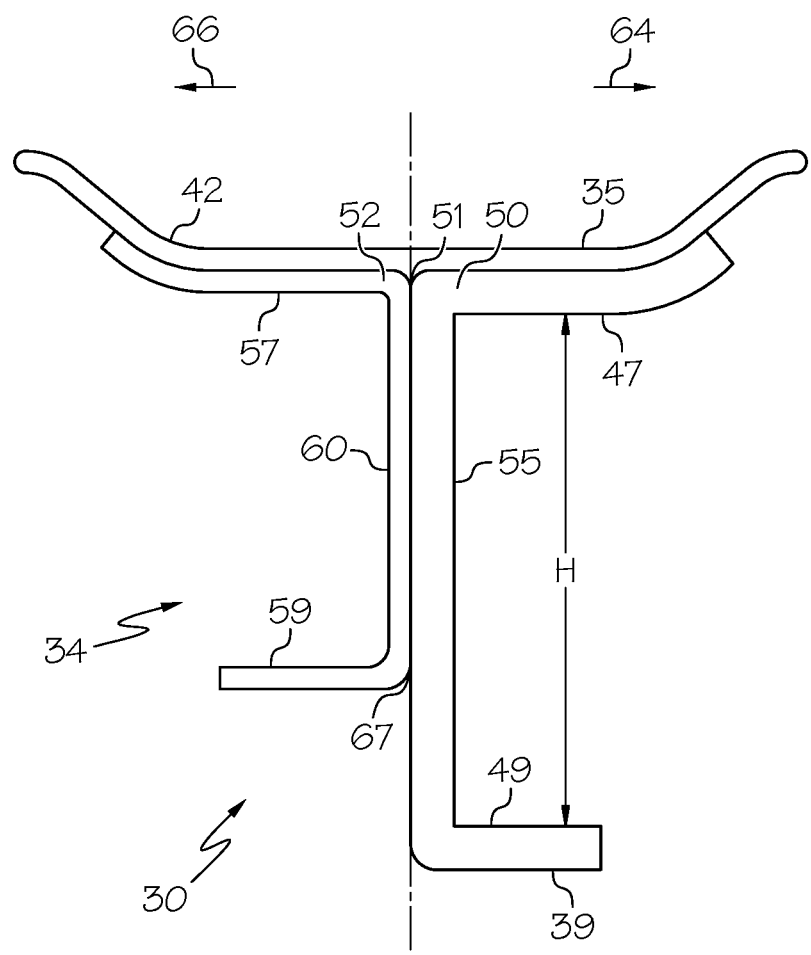
FIG. 8 is an axial forward looking aft cross-sectional view illustration of the fan blade platform formed with a third un-symmetric I beam formed with a second C beam having a C web larger than that of a first C beam.

The I beam 30 may be asymmetrical about a center plane 51 of the I web 45 such the interface 67, as illustrated in FIGS. 6-8, to offset inherent torsional loading due to forward and aft axial offsets. The first and second C beams 50, 52 may be asymmetric as illustrated in FIG. 6, having unequal or asymmetrical beam thicknesses T through the C beam flanges and webs illustrated herein with the second C beam being thicker than the first C beam. The first and second C beams 50, 52 may include unequal or asymmetrical I beam thicknesses T of at least one of the axially extending first and second C webs 55, 60, the upper or radially outer first and second C flanges 47, 57, and the lower or radially inner first and second C flanges 49, 59.

The first and second C beams 50, 52 in FIG. 7 have unequal or asymmetrical lower or radially inner first and second C flanges 49, 59. The second C flanges 59 is illustrated as being longer, indicated by length L, than the first C flange 49 in FIG. 7. The first and second C beams 50, 52 in FIG. 8 have unequal or asymmetrical first and second C webs 55, 60. The second C web 60 is illustrated as being larger or higher, indicated by height H, than the first C web 55 in FIG. 8.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A platform for use between adjacent gas turbine engine fan blades joined to a rotor disk to provide an inner flowpath boundary, the platform comprising:
    an axially extending I beam supporting a radially outer skin having a flowpath surface,
    the I beam including oppositely facing first and second C beams and radially outer and inner I flanges on radially outer and inner beam ends of an axially extending I web,
    the radially outer skin on top of and attached to the radially outer I flange,
    wherein the first C beam includes an axially extending first C web disposed between radially outer and inner first C flanges, and wherein the second C beam includes an axially extending second C web disposed between radially outer and inner second C flanges, the first and second C beams open in opposite first and second circumferential or side directions, and the first and second webs being back to back along a planar interface.

2. The platform as claimed in claim 1, further comprising the I beam being made from a non metallic composite or thermoplastic material.

3. The platform as claimed in claim 1, further comprising the first and second C webs being back to back and attached together.

4. The platform as claimed in claim 3, further comprising each of the first and second C webs being monolithic and made from a non metallic composite or thermoplastic material.

5. The platform as claimed in claim 4, further comprising weight relief holes formed post curing in the I web.

6. The platform as claimed in claim 1, further comprising the I beam being asymmetrical about a center plane of the I web.

7. The platform as claimed in claim 6, further comprising the I beam being made from a non metallic composite or thermoplastic material.

8. The assembly as in claim 1, wherein the I beam further includes stiffeners extending between the outer and inner I flanges.

9. The platform as claimed in claim 1, further comprising weight relief holes in the I web.

10. The platform as claimed in claim 1, further comprising weight relief holes formed post curing in the I web.

11. A platform for use between adjacent gas turbine engine fan blades joined to a rotor disk to provide an inner flowpath boundary, the platform comprising:
    an axially extending I beam supporting a radially outer skin having a flowpath surface,
    the I beam including oppositely facing first and second C beams and radially outer and inner I flanges on radially outer and inner beam ends of an axially extending I web,
    the radially outer skin on top of and attached to the radially outer I flange,
    the first C beam including an axially extending first C web disposed between radially outer and inner first C flanges,
    the second C beam including an axially extending second C web disposed between radially outer and inner second C flanges,
    the first and second C beams open in opposite first and second circumferential or side directions, and
    the first and second webs being back to back along a planar interface.

12. The platform as claimed in claim 11, further comprising the first and second C beams having asymmetrical I beam thicknesses of at least one of the axially extending first and second C webs, the radially outer first and second C flanges, and the radially inner first and second C flanges.

13. The platform as claimed in claim 12, further comprising the first and second C webs being back to back and attached together.

14. The platform as claimed in claim 12, further comprising each of the first and second C webs being monolithic and made from a non metallic composite or thermoplastic material.

15. The platform as claimed in claim 11, further comprising the first and second C beams having asymmetrical radially inner first and second C flanges.

16. The platform as claimed in claim 15, further comprising the first and second C webs being back to back and attached together.

17. The platform as claimed in claim 16, further comprising each of the first and second C webs being monolithic and made from a non metallic composite or thermoplastic material.

18. The assembly as in claim 11, wherein the I beam further includes stiffeners extending between the outer and inner I flanges.

19. The platform as claimed in claim 14, further comprising weight relief holes in the first and second C beams.

20. A gas turbine engine fan assembly comprising:
    a plurality of circumferentially spaced apart fan or rotor blades extending radially outwardly from a rotor disk,
    a platform between each adjacent pair of the blades and joined to the rotor disk,
    the platform including an axially extending I beam supporting a radially outer skin having a flowpath surface,
    the I beam including radially outer and inner I flanges on radially outer and inner beam ends of an axially extending I web, wherein the I beam further includes oppositely facing first and second C beams, and
    the radially outer skin on top of and attached to the radially outer I flange;
    wherein the first C beam includes an axially extending first C web disposed between radially outer and inner first C flanges, and wherein the second C beam includes an axially extending second C web disposed between radially outer and inner second C flanges, the first and second C beams open in opposite first and second circumferential or side directions, and the first and second webs being back to back and attached together along a planar interface.

21. The assembly as claimed in claim 20, further comprising the I beam being monolithic and made from a non metallic composite or thermoplastic material.

22. The assembly as claimed in claim 20, further comprising each of the first and second C webs being monolithic and made from a non metallic composite or thermoplastic material.

23. The assembly as claimed in claim 20, further comprising the I beam being asymmetrical about a center plane of the I web.

24. The assembly as claimed in claim 20, further comprising the first and second C beams having asymmetrical I beam thicknesses of at least one of the axially extending first and second C webs, the radially outer first and second C flanges, and the lower or radially inner first and second C flanges.

25. The assembly as claimed in claim 20, further comprising weight relief holes formed post curing in the I web.

26. The assembly as in claim 20, wherein the I beam further includes stiffeners extending between the outer and inner I flanges.

* * * * *